(12) United States Patent
Brockhaus et al.

(10) Patent No.: US 10,476,861 B2
(45) Date of Patent: Nov. 12, 2019

(54) CHARACTERIZING A CLIENT APPARATUS ON AT LEAST ONE SERVER APPARATUS

(71) Applicant: SIEMENS AKTIENGESELLSCHAFT, München (DE)

(72) Inventors: Hendrik Brockhaus, Unterbiberg (DE); Jens-Uwe Bußer, Neubiberg (DE); Steffen Fries, Baldham (DE); David von Oheimb, Heimstetten (DE)

(73) Assignee: Siemens Aktiengesellschaft, München (DE)

( * ) Notice: Subject to any disclaimer, the term of this patent is extended or adjusted under 35 U.S.C. 154(b) by 312 days.

(21) Appl. No.: 15/034,570

(22) PCT Filed: Oct. 2, 2014

(86) PCT No.: PCT/EP2014/071132
§ 371 (c)(1),
(2) Date: May 5, 2016

(87) PCT Pub. No.: WO2015/067415
PCT Pub. Date: May 14, 2015

(65) Prior Publication Data
US 2016/0344727 A1 Nov. 24, 2016

(30) Foreign Application Priority Data
Nov. 6, 2013 (DE) .................. 10 2013 222 503

(51) Int. Cl.
*H04L 29/06* (2006.01)
*H04L 9/32* (2006.01)
(Continued)

(52) U.S. Cl.
CPC ........ *H04L 63/0823* (2013.01); *H04L 9/3263* (2013.01); *H04L 9/3297* (2013.01);
(Continued)

(58) Field of Classification Search
None
See application file for complete search history.

(56) References Cited

U.S. PATENT DOCUMENTS

| | | | | |
|---|---|---|---|---|
| 6,981,139 B2 * | 12/2005 | Enokida | .............. | H04L 63/0442 713/156 |
| 7,383,434 B2 * | 6/2008 | Wildish | ................. | G06Q 30/06 380/282 |

(Continued)

FOREIGN PATENT DOCUMENTS

| | | |
|---|---|---|
| EP | 1965560 A1 | 9/2008 |
| EP | 2020798 A2 | 2/2009 |

OTHER PUBLICATIONS

Housley R. et al; "Internet X.509 Public Key Infrastructure Certificate and Certificate Revocation List (CRL) Profile", Nr. RFC 3280, URL: http://tools.ietfv.org/pdf/rfc3280:pdf, pp. 1-130; XP008115122, 2002.

(Continued)

*Primary Examiner* — Farid Homayounmehr
*Assistant Examiner* — Olanrewaju J. Bucknor
(74) *Attorney, Agent, or Firm* — Lempia Summerfield Katz LLC

(57) ABSTRACT

Systems and methods for characterizing a client apparatus on at least one server apparatus are provided. A first certificate is received in the event of a first request for a connection set-up from a server apparatus in a client apparatus. One or more predefined certificate parameters of the first certificate are stored as a set of characterization parameters in the client apparatus. Each further certificate from a server apparatus is checked that is received in the client apparatus in the event of a request for a further connection set-up, against the stored characterization parameter set. A request for a further connection set-up is accepted only if all of the predefined (Continued)

certificate parameters of the further certificate match all characterization parameters of the characterization parameter set.

20 Claims, 3 Drawing Sheets

(51) Int. Cl.
  *H04W 12/04* (2009.01)
  *H04W 12/08* (2009.01)
(52) U.S. Cl.
  CPC ............ *H04W 12/04* (2013.01); *H04L 63/10* (2013.01); *H04W 12/08* (2013.01)

(56) References Cited

U.S. PATENT DOCUMENTS

| | | | | |
|---|---|---|---|---|
| 8,539,567 | B1* | 9/2013 | Logue | H04L 63/0884 726/7 |
| 9,374,229 | B1* | 6/2016 | Schwengler | H04L 9/3263 |
| 9,819,682 | B2* | 11/2017 | Dabbiere | H04L 63/10 |
| 2004/0243805 | A1* | 12/2004 | Enokida | H04L 63/0823 713/175 |
| 2005/0102503 | A1* | 5/2005 | Imai | G06F 21/445 713/156 |
| 2005/0257058 | A1* | 11/2005 | Yoshida | H04L 29/06 713/175 |
| 2006/0143700 | A1* | 6/2006 | Herrmann | H04L 63/0823 726/14 |
| 2007/0005955 | A1* | 1/2007 | Pyle | H04L 9/3228 713/156 |
| 2008/0056494 | A1* | 3/2008 | Jacobson | H04L 63/166 380/255 |
| 2008/0077592 | A1* | 3/2008 | Brodie | G06F 21/31 |
| 2008/0104401 | A1* | 5/2008 | Miyamoto | H04L 9/3247 713/175 |
| 2009/0037997 | A1* | 2/2009 | Agbabian | H04L 63/1416 726/10 |
| 2010/0191967 | A1* | 7/2010 | Fujii | G06F 21/32 713/169 |
| 2013/0283042 | A1* | 10/2013 | Xiao | G06F 21/33 713/156 |
| 2014/0282869 | A1* | 9/2014 | Dabbiere | H04L 63/10 726/3 |
| 2014/0289826 | A1* | 9/2014 | Croome | H04L 67/141 726/5 |

OTHER PUBLICATIONS

Ylonen T et al: "The Secure Shell (SSH) Protocol Architecture", Network Working Group, Request for Comments: 4251, Jan. 2006. pp. 1-30.
European Office Action for corresponding Application No. 14786460. 7-1218 filed Jun. 7, 2019.
European Office Action for European Patent Application No. 14786460. 7-1870, dated Jul. 24, 2017.
European Office Action for corresponding Application No. 14786460. 7-1218 filed May 8, 2018.

* cited by examiner

FIG 3

```
Certificate ::= SEQUENCE {
    xxxx                        yyyy
    xxxx                        yyyy
    xxxx                        yyyy  }

TBSCertificate ::= SEQUENCE {
        Version            [0]  yyyy
        Serial number           yyyy
        Signature               yyyy
11 ──    Issuer                 yyyy
        Validity                yyyy
13 ──    User                   yyyy
        xxxx                    yyyy
        xxxx               [1]  yyyy
                                yyyy
        xxxx               [2]  yyyy
                                yyyy
15 ──    Extension          [3] yyyy
                                yyyy
    }
```

FIG 4

```
User ── 13

○ Country,
21 ── ○ Organization,
22 ── ○ Organizational unit,           ⎫
          ○ unique name,                ⎬ 23
          ○ State or province,         ⎭
          ○ general name (e.g. "Susan Housley"), and
          ○ Serial number
```

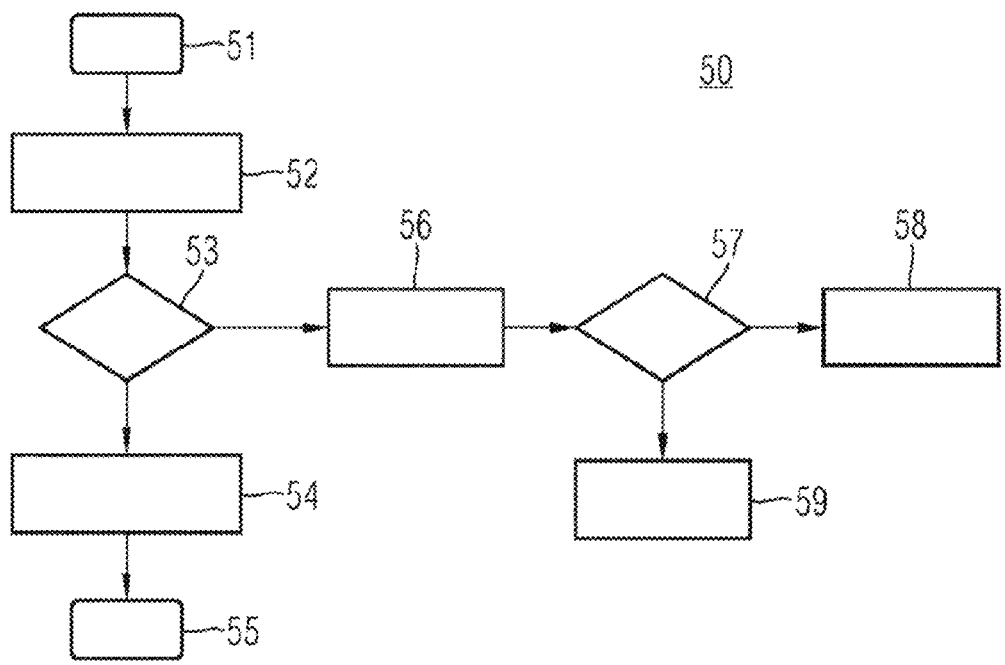

US 10,476,861 B2

CHARACTERIZING A CLIENT APPARATUS ON AT LEAST ONE SERVER APPARATUS

CROSS-REFERENCE TO RELATED APPLICATIONS

The present patent document is a § 371 nationalization of PCT Application Serial Number PCT/EP2014/071132, filed Oct. 2, 2014, designating the United States, which is hereby incorporated by reference, and this patent document also claims the benefit of DE 10 2013 222503.2, filed on Nov. 6, 2013, which is also hereby incorporated by reference.

TECHNICAL FIELD

Embodiments relate to a client apparatus and a method for characterizing a client apparatus on at least one server apparatus using a first certificate.

BACKGROUND

For a secure first start-up of devices, it is often necessary to generate or set up key material for the security functions of the device. It is similarly necessary to establish specific security associations. One example is the characterization of one client apparatus on a specific other server apparatus with which a connection may successfully be set up. In the case of a secure connection, the characterization may be based on a certificate of the remote station. The aim of the characterization is to restrict the communication partners from the perspective of the client apparatus to one server apparatus or one specific group of server apparatuses. Client apparatuses may be for example a field device, an intelligent meter such as a smart meter or a smart metering gateway, an automation station or a client apparatus of a time synchronization protocol (NTP). Corresponding server apparatuses are for example, a substation control unit, a data concentrator, a power transformer operating system server or an NTP server.

A known characterization method, for example of an RFID tag on an RFID reader, is carried out by moving the RFID tag toward the RFID reader, so that the RFID tag is recognized via near field communication (NFC) by the RFID reader and vice versa. Both the tag and the reader then store the communication partner and verify the communication partner during the next connection set-up. In a further known characterization method, for example in the setting up of a virtual LAN, a fixed address or a fixed identifier of the server apparatus with which a communication is permitted is specified administratively to a client apparatus. In a third known example of a characterization method, in the case of a communication via an encrypted network connection that is set up using a Secure Shell Protocol SSH, a fingerprint of the certificate of the first connection is stored in the client apparatus. The fingerprint of a certificate is, for example, a checksum that is formed over the entire certificate. In the event of further connection set-up requests, a check is carried out via a comparison of the fingerprint of the received further certificate with the stored fingerprint of the first certificate to determine whether the same certificate is involved.

If the validity of the certificate expires or if the secret key of a server apparatus is compromised, the certificate is then replaced. Certificates may be updated or renewed, for example, by an operating system update. On the other hand, root certificates, for example, are exchanged, for example via a Trust Anchor Management Protocol (TAMP) or via a local device management. All settings and stored data may also be deleted and therefore stored certificates may also be deleted and therefore the characterization may be cancelled, for example by a manual pressing of a button on the client apparatus.

It may similarly occur that a server apparatus suddenly fails and is replaced by a different server apparatus. Similarly, a changeover of a client apparatus between two domains of an operator may be required, for example to connect a conspicuous client apparatus from a server apparatus in a live system to a server apparatus in a test system for maintenance.

SUMMARY AND DESCRIPTION

The scope of the present invention is defined solely by the appended claims and is not affected to any degree by the statements within this summary. The present embodiments may obviate one or more of the drawbacks or limitations in the related art.

The object of the embodiments is to devise a method enabling a client apparatus to set up a connection to a different server apparatus reliably and without manual or other complex measures, even following the characterization.

The method according to an embodiment for characterizing a client apparatus on at least one server apparatus includes receiving of a first certificate in the event of a first request for a connection set-up from a server apparatus in a client apparatus. One or more predefined certificate parameters of the first certificate are stored as a set of characterization parameters in the client apparatus. The method further includes checking of each further certificate from a server apparatus that is received in the client apparatus in the event of a request for a further connection set-up against the stored characterization parameter set. The method further includes accepting of a request for a further connection set-up only if all of the predefined certificate parameters of the further certificate match all characterization parameters of the characterization parameter set.

A client apparatus is thereby advantageously not exclusively characterized on an individual certificate, as would be the case, for example, by storing and checking an entire certificate with all certificate parameters or a fingerprint of a certificate. A client apparatus may be characterized through the characterization on specific, prescribed parameters that form a set of characterization parameters on a group of certificates with common characteristics. In one advantageous embodiment, at least the value of one sub-parameter of a certificate parameter of the first certificate is stored as a characterization parameter.

As a result, for example, the structure of a certificate is utilized and a group of server apparatuses that satisfies a specific characteristic of the certificate parameter defined by the sub-parameters is permitted to communicate.

In a further embodiment, at least the value of one parameter or sub-parameter of an extension element of the first certificate is stored as a characterization parameter.

Using already defined extension elements of a certificate structured according to the X.509 standard, a role-based access control, for example, may be defined or server apparatuses may be represented via alternative subject designations, referred to as subjectAltNames, by DNS names or email addresses.

In a further embodiment, at least the value of one parameter or sub-parameter of an attribute certificate of a first certificate is stored as a characterization parameter.

Attribute certificates indicate further parameters or characteristics and thus allow further possibilities for the characterization on a group of server apparatuses with the aforementioned parameters or sub-parameters of the attribute certificate.

In one embodiment, at least one issuer of the first certificate is used as a characterization parameter.

In one embodiment, a further certificate that is received in the event of a request for a further connection set-up from a server apparatus is checked against the stored characterization parameter, bit-by-bit. The embodiment represents a simple comparison method that is simply and economically available in simple client apparatuses also.

In one embodiment, the predefined certificate parameters that are intended to be stored by a client apparatus on receiving a first certificate as a characterization parameter are notified to the client apparatus in a first certificate. The embodiment allows a highly flexible allocation of characterization parameters to a client apparatus, such as, for example, an application protocol. Different application protocols may thus be characterized on different characterization parameters.

In a further embodiment, the predefined certificate parameters to be stored as characterization parameters are indicated in at least one extension element of the first certificate. For example, the extension elements standardized by the X.509 standard for certificates are already available and may simply be used as carriers for the definition of the characterization parameters predefined for the client apparatus.

In an alternative embodiment, the predefined certificate parameters that are intended to be used as characterization parameters by a client apparatus on receiving a first certificate are predefined by an application of the client apparatus. The embodiment offers the advantage that no additional information relating to the characterization parameters needs to be transported between the client apparatus and the server apparatus. The embodiment reduces the data quantity to be exchanged and furthermore rules out a manipulation of the information transmission.

In a further embodiment, the predefined certificate parameters that are intended to be stored as characterization parameters by a client apparatus on receiving a first certificate are preconfigured in the client apparatus. The embodiment offers the advantage that the client apparatus determines and stores only the predefined and permanently specified certificate parameters that are intended to be used as characterization parameters in the certificate received in the first connection request.

A client apparatus according to an embodiment includes a receiving unit, a characterizing unit and a checking unit. The receiving unit is designed to receive a first certificate from a server apparatus in the event of a first request for a connection set-up. The characterizing unit is designed to store values of one or more predefined certificate parameters of the first certificate as a set of characterization parameters. The checking unit is designed to check each further certificate that is received from a server apparatus in the event of a request for a further connection set-up against the stored characterization parameter set and to accept the request for a further connection set-up only if all of the predefined certificate parameters of the further certificate match all characterization parameters of the characterization parameter set.

In the case of, for example, an expired certificate on which characterization has been effected, or in the event of a failure of one server apparatus, an embodiment offers the advantage of communicating with another server apparatus without manual measures having to be undertaken. Example embodiments of the method and a client apparatus according to an embodiment are shown by way of example and are explained in detail in the description below.

BRIEF DESCRIPTION OF THE DRAWINGS

FIG. 3 depicts a certificate according to an X.509 standard with certificate parameters according to an embodiment.

FIG. 4 depicts a certificate parameter with sub-parameters according to an embodiment.

FIG. 5 depicts an extension element according to an embodiment.

FIG. 6 depicts a flow diagram of the method according to an embodiment.

Parts corresponding to one another are denoted with the same reference numbers in all figures.

DETAILED DESCRIPTION

Figure 1:
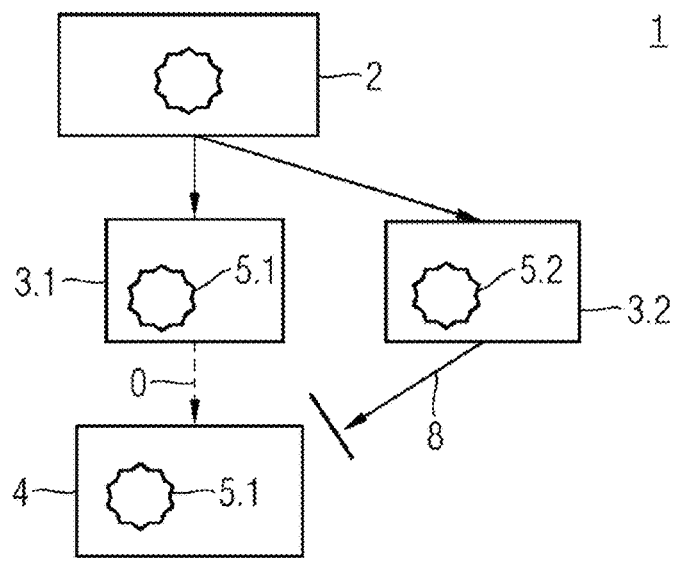
FIG. 1 depicts prior art of a schematic representation of a client-server system with a characterization of a client apparatus on a single dedicated server apparatus.

FIG. 1 depicts by way of example a client-server system 1 with a characterization, not corresponding to an embodiment, of a client apparatus 4. The client apparatus 4 checks a certificate 5.1 received from the server apparatus 3.1 during the first connection set-up 0 and imports the entire content of the certificate 5.1 into a security association list of the client apparatus 4. The server apparatus 3.1 is uniquely identified by the issuer and the serial number of the certificate 5.1. If the client apparatus 4 receives a further certificate 5.2 that differs from the stored certificate 5.1 from a further server apparatus 3.2 in the event of a subsequent request for a connection set-up 8, the connection set-up is refused by the client apparatus 4. A certificate is normally issued for each server apparatus 3.1, 3.2 by a certification body 2 based on a trustworthy root certification body. Instead of a check of the certificate 5.1 and 5.2, fingerprints of the respective certificate 5.1 and 5.2 may also be compared with one another. A fingerprint of a certificate may normally be, for example, the hash value for the respective certificate.

The client apparatus 4 is thus dedicated and characterized exclusively on one server apparatus 3.1 and accepts no communication with another server apparatus 3.2. If, for example, the validity of the certificate 5.1 expires, or if the secret key of the server apparatus 3.1 is compromised, the certificate 5.1 is replaced. Communication may then take place between the client apparatus 4 and another server 3.2 only through special interventions, for example an update of the operating system or a manual factory reset.

Figure 2:
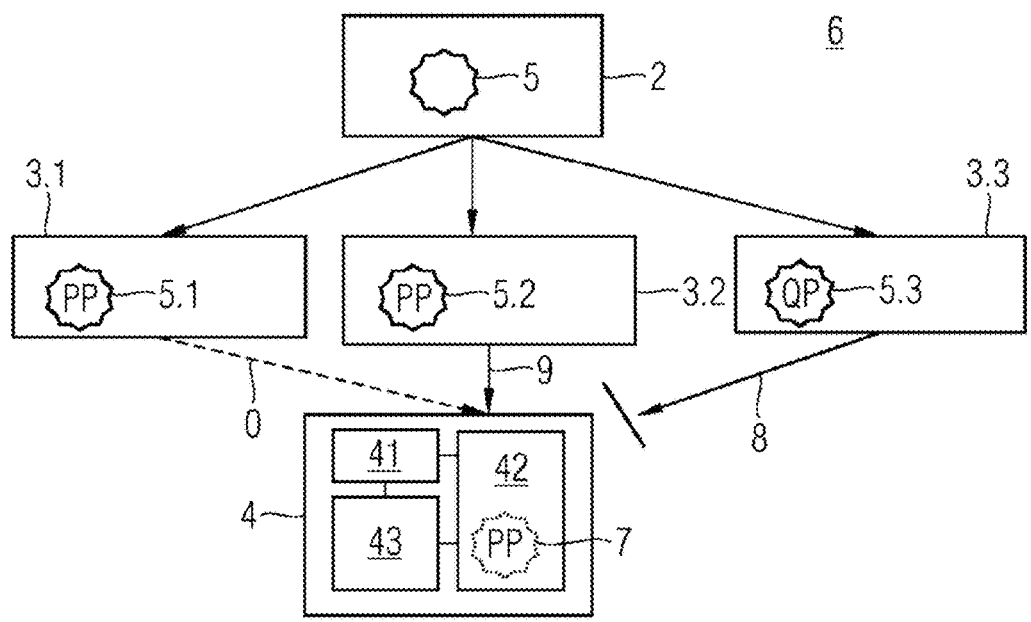
FIG. 2 depicts a schematic representation of a client-server system with characterization of a client apparatus on a group of server apparatuses according to an embodiment.

FIG. 2 depicts a client-server system 6 with a characterization using the method according to an embodiment. Each server apparatus 3.1, 3.2, 3.3 in each case includes one certificate 5.1, 5.2, 5.3 that was issued and notified by the certification body 2 at the request of the server apparatus 3.1, 3.2, 3.3. If the client apparatus 4 then receives a certificate 5.1 following the start-up in the event of a first request for a connection set-up from a server apparatus 3.1, the client apparatus 4 does not use the entire certificate 5.1, but only the values PP of one or more predefined certificate parameters of the certificate 5.1 subsequently as a set of characterization parameters 7. In the event of a further request 8 for a further connection set-up from a server apparatus 3.3, the transmitted further certificate 5.3 is checked against the stored set of characterization parameters 7. If all values of the predefined certificate parameters of the further certificate 5.3, here QP, match the values of all characterization parameters of the characterization parameter set 7, the request 8 is accepted by the client apparatus 4. If, as in the example depicted, the values QP of the predefined certificate parameters of the further server apparatus 3.3 differ from the set of characterization parameters PP, the connection set-up is refused.

If the client apparatus 4 receives a certificate in the event of a request for a connection set-up 9 from a server apparatus 3.2, and if the predefined certificate parameters of the certificate 5.2 have the same values, here PP, as the set of characterization parameters 7 in the client apparatus 4, similarly PP, the client apparatus 4 accepts the connection set-up request 9 and allows the set-up of a connection to the further server apparatus 3.2.

A characterization of the client apparatus 4 on a plurality of server apparatuses 3.1, 3.2 may thus be effected in a simple manner. A changeover, for example, of the client apparatus 4, for example a smart meter, from a live server apparatus 3.1 to a test server apparatus 3.2 in order to carry out a check may thus take place without a manual intervention in the client apparatus 4. In the same way, the client apparatus 4, following the check on the test server apparatus 3.2 may resume the connection to the live server apparatus 3.1.

Certificate parameters, for example, that identify the issuer of the certificate or the subject, for example, the server apparatus or the application for which certificate was issued, are suitable as predefined certificate parameters that are stored as characterization parameters. It is assumed here that the issuer of the certificate may be, but not exclusively, a sub-certification body under the root certification body.

The client apparatus 4 includes a receiving unit 41, a characterizing unit 42 and a checking unit 43 that are in each case interconnected. The receiving unit 41 includes, for example, an interface to an Internet cable or a receiving unit for a radio link that receives a first certificate 5.1 in the event of a first request for a connection set-up from a server apparatus 3.1. At least the value PP of the one or more predefined certificate parameters of the first certificate 5.1 is stored as a characterization parameter set 7 in the characterizing unit 42. In the event of a request 9 for a further connection set-up, the certificate 5.2 also supplied by a server apparatus, for example the server apparatus 3.2, is received in the receiving unit 41 and is checked in the checking unit 43 against the characterization parameter set 7 stored in the characterizing unit 42. If all values PP of the predefined certificate parameters of the further certificate 5.2 match all characterization parameters of the characterization parameter set 7, the checking unit 43 accepts the request and sets up the connection to the server apparatus 3.2. If the values QP of the predefined certificate parameters of the further certificate 5.3 received, for example, from the server apparatus 3.3 do not match all characterization parameters of PP of the characterization parameter set 7 in the event of a request 8, the checking unit 43 refuses the request. Alternatively or additionally, the information may be stored in a logging file and/or may be transmitted to a, for example, preconfigured logging server.

FIG. 3 depicts an example of a certificate 10 that is structured according to the X.509 standard of the International Telecommunication Union ITU-T. Certificate parameters are the different entries specified under the "TBS Certificate" heading. The "issuer" 11 and "subject" 13 parameters that may, for example, have a sub-structure 23 with sub-parameters are particularly suitable for the characterization. A sub-structure 23 is shown by way of example in FIG. 4 for the certificate parameter 13. The "organization" 21 sub-parameters or an "organizational unit" 22 parameter indicating a sub-unit, for example, are suitable for the characterization of a client apparatus 4 on a group of server apparatuses.

Parameters or sub-parameters of an extension element, see FIG. 3, referred to as "extensions" 15, may also be used.

FIG. 5 depicts by way of example an extension element 15. A certificate may be extended by role information "UserRoleInfo" 33. The client apparatus 4 may be characterized via the "userRole" 31 parameters, for example on the "authorization server" role. The "aor" 32 parameter that indicates an area of responsibility may also be stored as a characterization parameter in the client apparatus 4. Each server apparatus 3.1, 3.2 with the same value PP of the characterization parameter set 7 is then permitted by the client apparatus 4 as a communication partner.

Parameters from attribute certificates that are allocated to a certificate may furthermore be stored as characterization parameters. As a result, it is therefore possible not to characterize a client apparatus 4 on a dedicated server, but instead to enable the communication and therefore the connection set-up on a group of server apparatuses 3.1, 3.2. The changeover of the certificates 5.1, 5.2 within the group of server apparatuses that have the same characterization parameters is therefore also enabled. However, the unwanted changeover to a server apparatus 5.3 that does not have the corresponding characterization parameters may still be prevented.

Certificates 5, 5.1, 5.2, 5.3, etc., from commercial certificate issuers such as, for example, Verisign or Telekom, may be used. Certificates 5, 5.1, 5.2, 5.3, etc., that are used may comply with the X.509 standard. However, non-standardized certificates that have a logical structure of the certificate parameters, for example the subject, e.g. the application or the server appliance, may also be used.

FIG. 6 depicts the method according to an embodiment for characterizing a client apparatus on server apparatuses in the form of a flow diagram 50. Starting from the initial state 51, a certificate is received at act 52 in a client apparatus in the event of the first request to set up a connection from a server apparatus 3. At act 53, the client apparatus checks whether a certificate or characterization parameters are already stored. If not, the client apparatus selects predefined certificate parameters as a set of characterization parameters and stores the certificate or at least these characterization parameters. The characterization, see act 55, of the client apparatus is performed on server apparatuses whose certificates have the same values in the predefined certificate parameters as the characterization parameters.

The predefined certificate parameters 11, 12 or sub-parameters 21, 22 or parameters or sub-parameters 31, 32 of an extension element 15 that are intended to be stored by a client apparatus as a set of characterization parameters 7 on receiving a first certificate 5.1 may be notified to the client apparatus 4 in the first certificate 5.1. An extension element of the first certificate, for example, is suitable for the purpose. However, the predefined certificate parameters may also be predefined in an application in a client apparatus 4 itself. The application selects the certificate parameters predefined for the application in the event of a first connection set-up and stores these as characterization parameters.

Alternatively, the predefined certificate parameters may be preconfigured in the client apparatus 4.

If the client apparatus 4 establishes in the check 53 that a set of characterization parameters 7 is already stored in the client apparatus 4, the client apparatus 4 checks the received further certificate in act 56 against the stored characterization parameter set 7. If all of the predefined certificate parameters of the further certificate match all characterization parameters of the characterization parameter set 7, the connection request is accepted and a connection is set up to the further server apparatus, see act 58. If at least one of the predefined certificate parameters did not match the characterization parameter set 7, the connection request is refused, see act 59.

The check of the predefined certificate parameters against the characterization parameter set may be carried out, for example, bit-by-bit. The check simplifies a corresponding check routine, since the certificate parameters do not have to be evaluated in a dedicated manner.

All described and/or characterized features may be combined with one another within the scope of the invention. The invention is not limited to the example embodiments described.

It is to be understood that the elements and features recited in the appended claims may be combined in different ways to produce new claims that likewise fall within the scope of the present invention. Thus, whereas the dependent claims appended below depend from only a single independent or dependent claim, it is to be understood that these dependent claims may, alternatively, be made to depend in the alternative from any preceding or following claim, whether independent or dependent, and that such new combinations are to be understood as forming a part of the present specification.

While the present invention has been described above by reference to various embodiments, it may be understood that many changes and modifications may be made to the described embodiments. It is therefore intended that the foregoing description be regarded as illustrative rather than limiting, and that it be understood that all equivalents and/or combinations of embodiments are intended to be included in this description.

The invention claimed is:

1. A method for characterizing a client apparatus on at least one server apparatus, the method comprising:
   receiving a first certificate from an at least one first server apparatus in the client apparatus in an event of a first request for a connection set-up;
   storing values of one or more permanently specified certificate parameters of the first certificate as a stored characterization parameter set in the client apparatus; wherein no other values for the permanently specified certificate parameters will be stored in the client apparatus; wherein the one or more permanently specified certificate parameters of the first certificate are a subset of the first certificate;
   checking, by the client apparatus, values for one or more permanently specified certificate parameters of a second certificate received from a second server apparatus against values for the stored characterization parameter set in the event of a further request for a connection set-up; and
   accepting the further request for the connection set-up only when all values for the one or more permanently specified certificate parameters of the second certificate match all values for the stored characterization parameter set.

2. The method of claim 1, wherein at least one value of a sub-parameter of one of the permanently specified certificate parameters of the first certificate is used as one of the stored characterization parameter set.

3. The method of claim 1, wherein at least one value of a parameter or sub-parameter of an extension element of the first certificate is used as one of the stored characterization parameter set.

4. The method of claim 1, wherein at least one value of a parameter or sub-parameter of an attribute certificate of the first certificate is used as one of the stored characterization parameter set.

5. The method of claim 1, wherein at least one issuer of the first certificate is used as one of the stored characterization parameter set.

6. The method of claim 1, wherein the checking of the second certificate that is received from the server apparatus in the event of the further request for the connection set-up against the stored characterization parameter set is carried out bit-by-bit.

7. The method of claim 1, wherein the permanently specified certificate parameters that are stored as characterization parameters by the client apparatus on receiving the first certificate are notified to the client apparatus in the first certificate.

8. The method of claim 7, wherein the permanently specified certificate parameters that are stored as characterization parameters are indicated in at least one extension element of the first certificate.

9. The method of claim 1, wherein the permanently specified certificate parameters that are stored as characterization parameters by the client apparatus on receiving the first certificate are predefined by an application of the client apparatus.

10. The method of claim 1, wherein the permanently specified certificate parameters that are stored as characterization parameters by the client apparatus on receiving the first certificate are preconfigured in the client apparatus.

11. A client apparatus, comprising:
    a wireless receiver;
    a memory coupled to a processor;
    wherein the wireless receiver is configured to receive a first certificate from a server apparatus in an event of a first request for a connection set-up;
    wherein the memory coupled to the processor is configured to store the values of one or more permanently specified certificate parameters of the first certificate as a stored characterization parameter set; wherein no other values for the one or more permanently specified certificate parameters will be stored in the client apparatus; wherein the one or more permanently specified certificate parameters of the first certificate are a subset of the first certificate;
    wherein the processor is configured to check values for one or more permanently specified certificate parameters of a second certificate received from a second server apparatus against values for the stored characterization parameter set in the event of a request for a further connection set-up and to accept the request for the further connection set-up only when all values of all of the one or more permanently specified certificate parameters of the second certificate match all values of the stored characterization parameter set.

12. The client apparatus as claimed in claim 11, wherein at least one value of a sub-parameter of one of the certificate parameters of the first certificate is used as one of the stored characterization parameter set.

13. The client apparatus as claimed in claim 11, wherein at least one value of a parameter or sub-parameter of an extension element of the first certificate is used as one of the stored characterization parameter set.

14. The client apparatus as claimed in claim 11, wherein at least one value of a parameter or sub-parameter of an attribute certificate of the first certificate is used as one of the stored characterization parameter set.

15. The client apparatus as claimed in claim 11, wherein at least one issuer of the first certificate is used as one of the stored characterization parameter set.

16. The client apparatus as claimed in claim 11, wherein the checking of values for certificate parameters of the second certificate is carried out bit-by-bit.

17. The client apparatus as claimed in claim 11, wherein the permanently specified certificate parameters that are stored as characterization parameters by the client apparatus on receiving the first certificate are notified to the client apparatus in the first certificate.

18. The client apparatus as claimed in claim 17, wherein the permanently specified certificate parameters that are stored as characterization parameters are indicated in at least one extension element of the first certificate.

19. The client apparatus as claimed in claim 11, wherein the permanently specified certificate parameters that are stored as characterization parameters by the client apparatus on receiving the first certificate are predefined by an application of the client apparatus.

20. The client apparatus as claimed in claim 11, wherein the permanently specified certificate parameters that are stored as characterization parameters by the client apparatus on receiving the first certificate are preconfigured in the client apparatus.

* * * * *